(12) United States Patent
Siler et al.

(10) Patent No.: US 8,680,410 B2
(45) Date of Patent: Mar. 25, 2014

(54) SELF-LOCKING IGNITION SWITCH

(75) Inventors: Donald J. Siler, Grand Blanc, MI (US);
Vincent C. Mercier, Lake Orion, MI (US)

(73) Assignee: ALPS Electric Co., Ltd., Tokyo (JP)

( * ) Notice: Subject to any disclaimer, the term of this patent is extended or adjusted under 35 U.S.C. 154(b) by 260 days.

(21) Appl. No.: 13/214,551

(22) Filed: Aug. 22, 2011

(65) Prior Publication Data

US 2013/0048475 A1    Feb. 28, 2013

(51) Int. Cl.
*H01R 31/08* (2006.01)

(52) U.S. Cl.
USPC .................................................. 200/43.05

(58) Field of Classification Search
USPC ............ 200/43.05, 296, 43.08, 43.04, 43.01, 200/19.28, 50.02, 50.09, 50.28, 20.29, 566, 200/567, 19.18, 43.22; 439/188
See application file for complete search history.

(56) References Cited

U.S. PATENT DOCUMENTS

| 3,621,682 | A | * | 11/1971 | Schmidt | 70/492 |
| 3,632,913 | A | * | 1/1972 | Hukuta | 200/43.08 |
| 4,146,761 | A | * | 3/1979 | Sung | 200/43.04 |
| 6,133,648 | A | * | 10/2000 | Titus et al. | 307/10.2 |

* cited by examiner

*Primary Examiner* — Edwin A. Leon
*Assistant Examiner* — Anthony R. Jimenez
(74) *Attorney, Agent, or Firm* — Brinks Gilson & Lione

(57) ABSTRACT

A self-locking ignition switch for engagement with a lock housing driver of a motor vehicle having a key activated ignition system. The ignition switch includes a switch mechanism that is moveable between multiple key positions. The switch mechanism is enclosed within a casing, and the casing including a collar extending from a side wall of the casing and terminating at a distal end. The collar further has portions defining an interference and portions defining a side opening extending from the distal end toward the side wall of the casing. A slide member positioned within the collar and biased by a biasing member so as to engage the interference. Engagement between the interference and the slide member forms a lockout that fixes the switch mechanism in an installation configuration and prevents movement of the portions of the switch mechanism between the multiple key positions prior to installation.

20 Claims, 3 Drawing Sheets

SELF-LOCKING IGNITION SWITCH

BACKGROUND

1. Field of the Invention

The present invention generally relates to an ignition switch for a motor vehicle. More specifically, the invention relates to an ignition switch that is self-locking in an installation configuration.

2. Description of Related Art

Currently, motor vehicle ignition switches are designed such that the ignition switch can be rotated between several key positions, which include OFF, ACC, RUN, and START. To define these positions, the ignition system utilizes a detent mechanism wherein a different detent position holds the ignition switch in each of the key positions. In addition to providing a tactile indication that the ignition switch has been moved to a different key position, the detent mechanisms are used to maintain the ignition switch in a known position that will allow it to be installed in the motor vehicle and engage with the lock driver of the assembly.

Because the detent mechanism is utilized in establishing the installation configuration for the ignition switch, if one desired to remove the detent mechanism from the ignition switch in order to simplify construction, one would encounter the problem where the ignition switch is not maintained in a known configuration or one that would allow it to be installed to ensure engagement with the lock driver.

In view of the above, it is apparent that there exists a need for a means by which an ignition switch can be fixed in an installation configuration while not requiring that the ignition switch does not include or does not utilize detent mechanisms associated with the various key positions to maintain the ignition switch in its installation configuration.

In addition to the above, various regulations around the world require that the ignition switch be constructed such that it cannot be removed from the lock housing in the OFF key position. As such, a potential thief cannot remove the ignition switch simply by releasing the fasten feature.

SUMMARY

In satisfying the above need, as well as overcoming the enumerated drawbacks and other limitations of the related art, in one aspect the present invention provides a self-locking ignition switch for engagement with a lock housing driver of a motor vehicle having a key activated ignition system. The ignition switch comprises a switch mechanism that is moveable between multiple key positions. The switch mechanism is enclosed within a casing, and the casing including a collar extending from a side wall of the casing and terminating at a distal end. The collar further has portions defining an interference and portions defining a side opening extending from the distal end toward the side wall of the casing. The switch mechanism further includes a slide member positioned within the collar, the slide member biased by a biasing member so as to engage the interference. Whereby engagement between the interference and the slide member forms a lockout that fixes the switch mechanism in an installation configuration and prevents movement of the portions of the switch mechanism between the multiple key positions prior to installation of the ignition switch.

In another aspect, the invention provides an ignition switch for engagement with a lock housing driver of a motor vehicle having a key activated ignition system wherein the ignition switch includes a switch mechanism having portions moveable between multiple key positions. The switch mechanism is enclosed within a casing, and the casing including a collar extending from a side wall of the casing and terminating at a distal end. The collar further has portions defining a side opening extending from the distal end toward the side wall of the casing. The switch mechanism further includes a moveable wall member, positioned within the collar, which can be moved between a first position and a second position. In the first position, a central region within the collar is accessible through the side opening of the collar. In the second position, the side opening is obstructed by the wall member such that the central region is not accessible through the side opening.

Further objects, features and advantages of this invention will become readily apparent to persons skilled in the art after a review of the following description, with reference to the drawings and claims that are appended to and form a part of this specification.

DETAILED DESCRIPTION

Figure 1:
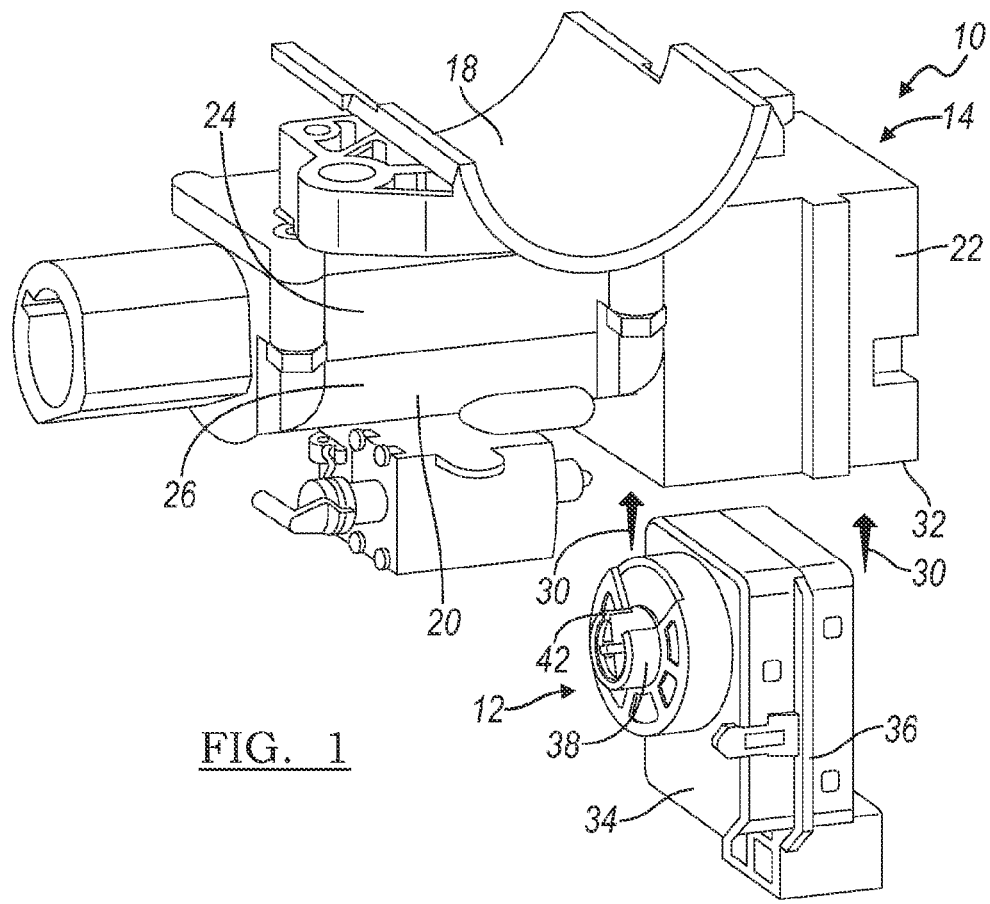
FIG. 1 is an exploded perspective view of an ignition switch assembly embodying the principles of the present invention.
Figure 2:
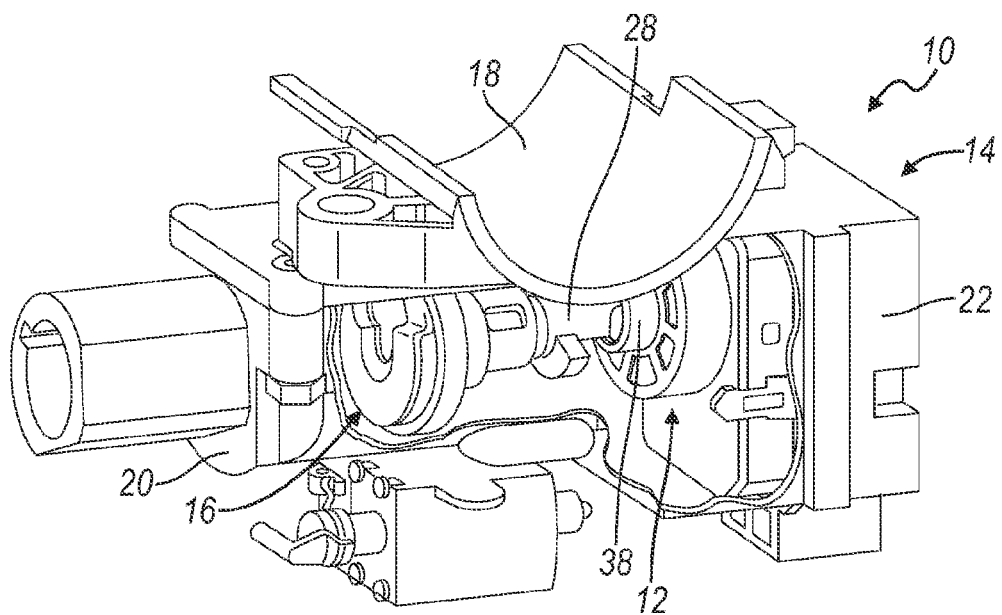
FIG. 2 is a view similar to FIG. 1 illustrating the ignition switch assembly, with portions broken away to see the engagement of various internal components thereof.

Referring now to the drawings, an ignition assembly embodying the principles of the present invention is generally illustrated therein and designated at 10. As its primary components, the ignition assembly 10 includes an ignition switch 12, a lock housing 14, a lock cylinder (not shown) and a lock driver 16, all of which are typically incorporated into the steering column assembly (not shown) of a motor vehicle. As seen in FIGS. 1 and 2 the ignition assembly 10 further incorporates a saddle 18 so as to secure the ignition assembly 10 to the steering column (not shown) of the steering column assembly. The lock driver 16 is engaged with the ignition switch 12 such that when a key is inserted into the lock cylinder and turned, the cylinder causes the lock driver 16 to correspondingly turn, which further manipulates the ignition switch 12 into one of its OFF, ACC, RUN and START key positions.

The lock housing 14 is itself divided into two parts, namely a driver housing 20 and an ignition switch housing 22. These housings respectively contain the lock driver 16 and the ignition switch 12 therein.

To position the lock driver 16 within the driver housing 20, the driver housing 20 is formed by two half shells 24, 26 that define a cavity into which the lock driver 16 is seated. The half shells 24, 26 can be secured together by various conventional means including, but not limited to, an internally threaded boss on one of the half shells and externally threaded bolt extended through a correspondingly positioned bolt opening on the other of the half shells.

The ignition switch 12 is received into a cavity defined within the ignition switch housing 22. To receive the ignition switch 12 in that cavity, the ignition switch housing 22 is provided with an opening 32 in one wall thereof, and the ignition switch 12 is inserted into the cavity through the opening. In the view presented by FIGS. 1 and 2, this opening 32 is provided in the lower end or bottom wall of the ignition switch housing 22.

Although the lock driver 16 is received within the driver housing 20, a distal or driver end 28 of the lock driver 16 extends a predetermined distance into the cavity of the ignition housing 22. When the ignition switch 12 is installed in the ignition switch housing 22, this driver end 28 engages a portion of the ignition switch 12, as is further described below, to operate the switch 12.

As suggested above, the ignition switch 12 is the mechanism which specifically determines the operating state of the motor vehicle. As such, the ignition switch is constructed so as to define various key positions, which include OFF, ACC, RUN and START. When a key is inserted into the ignition assembly 10 and turned to the START position, various internal components of the ignition switch 12 are caused to rotate, thereby initiating communication with the electronic control module (ECM) of the vehicle, which in turn communicates with other vehicle components, such as the starter, to start the engine of the vehicle. Once the vehicle has started, the operator releases the key back to the RUN position. With the switch 12 in this position, the ECM causes the starter to disengage and the engine to continue the RUN. When turned to the OFF position, the ignition switch sends a signal to the ECM to shut the engine down. In the ACC position, the ignition switch 12 causes the ECM to allow various systems of the vehicle, such as the entertainment system, to operate without the running of the vehicle's engine.

As previously mentioned, the ignition switch 12 is inserted into the ignition switch housing 22 by passing the ignition switch 12 through the opening 32, generally in the direction of arrows 30 seen in FIG. 1. The ignition switch 12 is inserted into the cavity until it engages with the driving end 28 of the lock driver 16. To facilitate positioning of the ignition switch 12 within the housing 22, longitudinal ribs (an alignment or guiding feature) 36 are formed on the exterior casing 34 of the ignition switch 12. The ribs 36, which are seen in FIG. 1, are designed to engage with a corresponding longitudinal groove formed in an internal sidewall of the ignition switch housing 22.

The lock driver 16 extends into the ignition switch housing 22 along an axis that is perpendicular to the installation direction of the ignition switch 12 and to an extent that would interfere with installation of the ignition switch 12. For this reason, the ignition switch 12 includes features that allow maintain the ignition switch in orientation permitting full installation of the ignition switch 12 and engagement with the driving end 28 of the lock driver 16.

Figure 3:
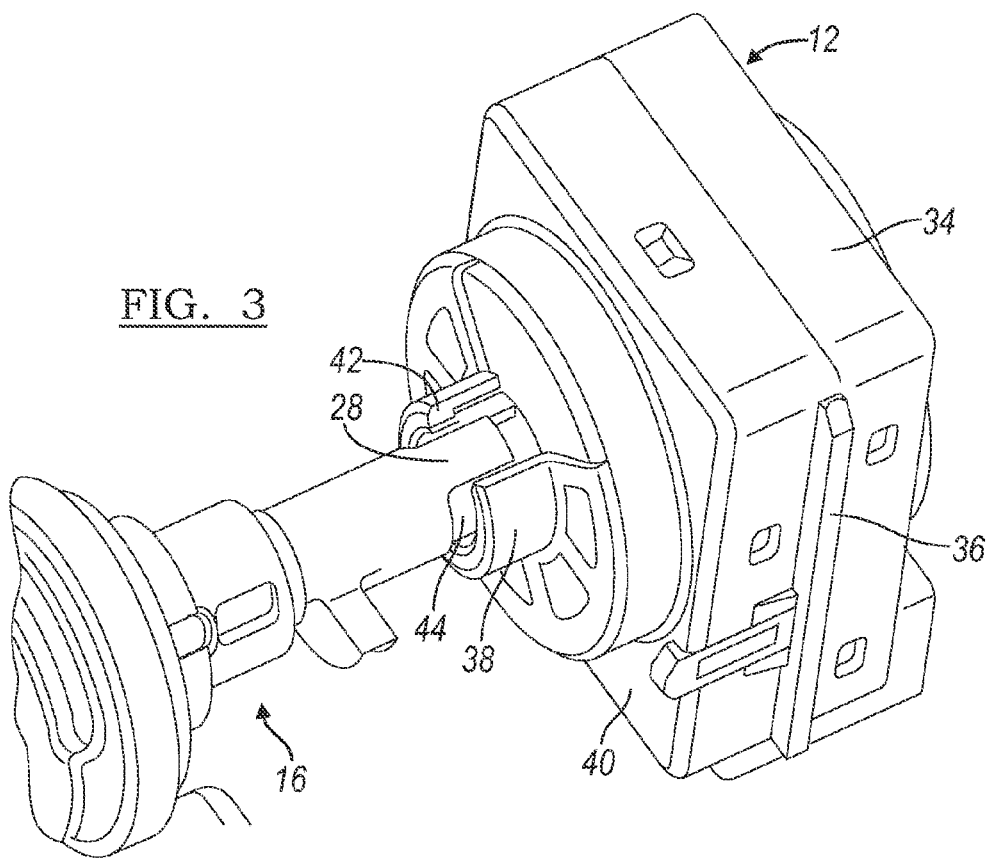
FIG. 3 is a partial perspective view of the engagement of the internal components seen in FIG. 2.

As seen in FIG. 3, the driving end 28 of the lock driver 16 is shown engaged with the ignition switch 12 (in this figure, the lock housing 14 is omitted in the interest of clarity). In order to engage with the driving end 28 of the lock driver 16, the ignition switch 12 is provided with a collar 38 that extends from a wall 40 of the switch case 34 that faces in the direction of the lock driver 16. As such, the collar 38 extends axially in the direction of the lock driver 16.

As mentioned previously, during installation, the ignition switch 12 is inserted in a direction that is perpendicular to the longitudinal axis of the lock driver 16. To permit the driving end 28 to be received into the collar 38, a side opening 42 (that is open in the direction of insertion 30) is defined in the collar 38. The side opening 42 extends circumferentially around or about the collar 38 less than 180°, and more preferably less than 90°, of the circumferential extent of the collar 38. Accordingly, during installation, the rib 36 positions the ignition switch 12 such that the driving end 28 of the lock driver 16 passes through the side opening 42 and into collar 38 until fully seated therein, which occurs simultaneously with full insertion of the ignition switch 12 in the ignition switch housing 22. To further facilitate engagement of the driving end 28 within the collar 38, the driving end 28 is formed with a pair of opposed flat lands or surfaces 44. The width between the lands 44 is sized to be less than the effective width of the side opening 42.

For ease of installation, it is preferable that the ignition switch 12 is locked in a preset, installation position. This not only facilitates installation, but also provides a known initial key position for the ignition switch 12 relative to the lock driver 16. As noted above, detent systems were previously used to define the key positions of the ignition system and to hold the ignition switch in a specific orientation prior to and during installation. However, the ignition switch 12 utilized in the present invention does not include detent mechanisms to define the key positions. Accordingly, a novel way of fixing the installation orientation of the ignition switch 12 had to be developed.

The present invention fixes the installation orientation of the ignition switch 12 through a modification of the key buzzer switch that is conventionally found in ignition assemblies. The key buzzer switch is a switch that activates a buzzer (an audible signal) whenever the ignition switch is in the OFF position and the vehicle's key is located within the ignition assembly; the purpose of which is to try and prevent the locking of the key in the vehicle when the operator leaves the vehicle.

The key buzzer switch can take on a variety of constructions and the details of such constructions are well known in the industry and generally specific to the particular application. However, a common component is a slide member of the ignition switch that depressed when the key is located in the ignition assembly. When the slide member is depressed and the ignition switch is in the OFF position, the key buzzer switch is in a closed switch position and the buzzer is activated. By removing the key from the ignition assembly, the slide member is biased into an open switch position and the buzzer is not activated.

Figure 4:
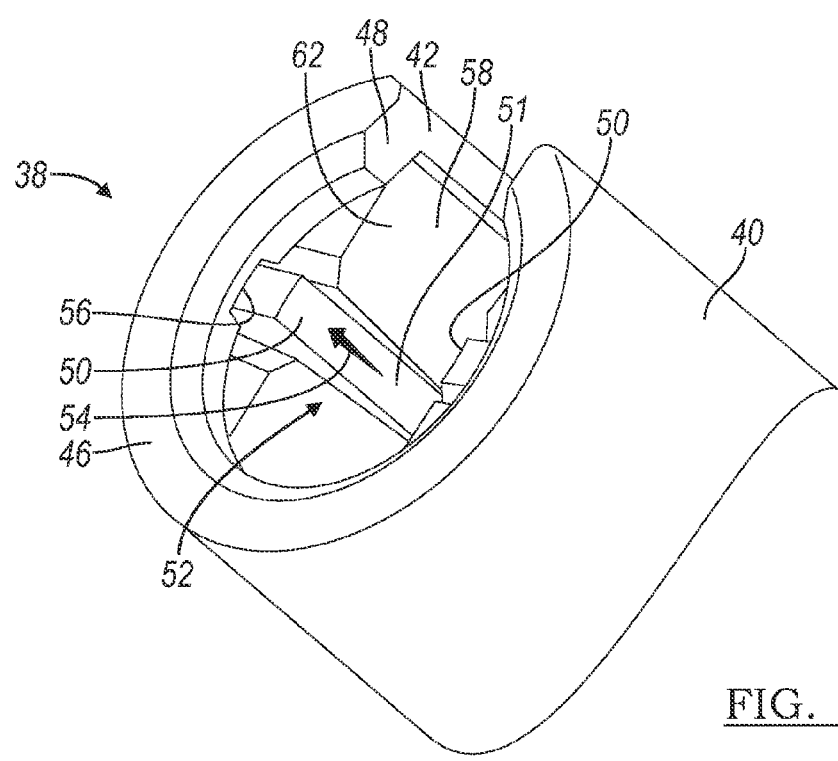
FIG. 4 is an enlarged perspective view of the collar and associated components of the ignition switch in an installation configuration.

Referring now to the enlarged view of the collar 38 in FIG. 4, as seen therein the collar 38 terminates at its outward or distal end 46 in a lip or flange 48. The flange 48 extends radially inward from the distal end 46 to form an internal overhang. Within the collar 38, and beneath the overhang of the flange 48, are two fingers or portions 50 of a slide member 51 of a key buzzer switch 52 (the remaining details and components of the key buzzer switch 12 are being omitted in that they are well known). The slide member 51 is biased by a spring or other biasing means such that the fingers 50 are urged into contact with the flange 48, which is generally in the direction of arrow 54.

Formed in the flange 48, at opposed locations, are interferences or recesses 56. The recesses 56 are sized to receive and engage the ends of the fingers 50 of the slide member 51. Being biased in the direction of arrow 54, the engagement between the recesses 56 and the ends of the fingers 50 operates to self-lock the ignition switch 12 in a fixed rotary position, which happens to be the installation configuration of the ignition switch 12. This rotary position may also correspond to one of the key positions, such as the ON position.

As seen in FIG. 4, when the ends of the fingers 50 are engaged with the recesses 56, the constitution of the associated components of the collar define an open central region 58, corresponding in width to the side opening 42 and for receiving the driving end 28 of the lock driver 16. When the lock driver is received in the central region 58, insertion of a key will cause advancement of a plunger (not shown) in the lock driver 16, and the plunger will depress the slide member 51 in an opposite direction to arrow 54, causing the end of the fingers 50 to withdrawal or retract from the recesses 56 and allow the ignition switch 12 to be rotated to any of key positions.

By initially configuring the ignition switch 12 such that the ends of the fingers 50 are located in the recesses 56, the ignition switch 12 is locked in installation configuration ensuring that the driving end 28 of the lock driver 16 will be received therein during installation and that the initial position of the ignition switch 12 will be known after installation.

Once installed, advancement of the plunger of the lock driver 16 disengages the fingers 50 from the recesses 56 and allows the ignition switch 12 to be rotated out of the installation configuration and into the OFF position. Various governmental regulations require that the construction of an ignition assembly be such that the ignition switch cannot be removed from the switch housing when in the OFF position. To achieve this with the prevent invention, an internal wall 60 provided as part of the associated components within the collar 38.

Figure 5:
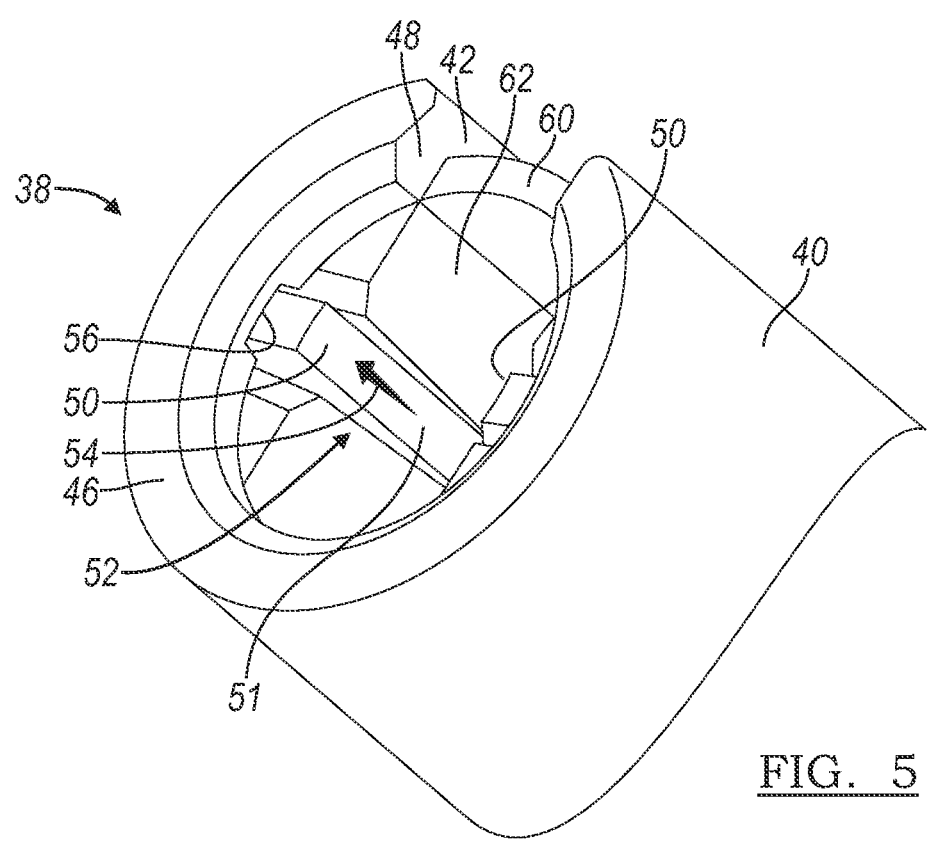
FIG. 5 is an enlarged perspective view of the collar and associated components of the ignition switch in an installed orientation whereby the ignition switch is prohibited from being removed from the lock housing.

As seen in FIG. 5, when rotated into the OFF position, the internal wall 60 is moved into a position where it blocks and obstructs the side opening 42 in the collar 38. While FIG. 5 looks very similar to FIG. 4, in FIG. 5 the various components within the collar 38 have been rotated 180° from their position in FIG. 4. Thus, in FIG. 4, the internal wall 60 is not visible, but is located opposite of the side opening 42 and under the flange 48. When moved to the position seen in FIG. 5, the internal wall 60 encloses and captures the driving end 28 of the lock driver 16 within the central region 58 of the collar 38, thereby preventing the ignition switch 12 from being disengaged from the lock driver 16 and removed from the lock housing 14.

The internal wall 60 is formed integrally or unitarily with other wall portions 62 also provided within the collar 38. These other wall portions 62 also operate to form guides between which the slide members 51 are retained and directed. While the wall portion 60 is shown as being moved 180° from its position in FIG. 4 so as to obstruct the side opening 42, the amount of rotation can be less than 180° so long as a portion of the other wall portions 62 obstructs the side opening 42 and prevents withdrawal of the driving end 28 of the lock driver 16 through the side opening 42.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A self-locking ignition switch for engagement with a lock housing driver of a motor vehicle having a key activated ignition system, the ignition switch comprising:
   a switch mechanism, the switch mechanism having portions moveable between multiple key positions;
   a casing, the switch mechanism being enclosed within the casing and the casing including a collar extending from a side wall of the casing and terminating at a distal end, the collar further having a side opening extending from the distal end toward the side wall of the casing, the collar further including portions defining an interference; and
   the switch mechanism further including a slide member positioned within the collar, the slide member biased by a biasing member so as to engage the interference;
   whereby engagement between the interference and the slide member forms a lockout that fixes the switch mechanism in an installation configuration and prevents movement of the portions of the switch mechanism between the multiple key positions prior to installation of the ignition switch.

2. The ignition switch of claim 1, wherein the collar extends generally perpendicularly and in an axial direction from the side wall of the casing.

3. The ignition switch of claim 2, wherein the slide member is moveable in the axial direction.

4. The ignition switch of claim 1, wherein the interference is a recess defined in the collar.

5. The ignition switch of claim 4, wherein the slide member engages the interference by way of an end of the slide member being received in the recess.

6. The ignition switch of claim 4 wherein the recess is formed in a radially inwardly directed flange of the collar.

7. The ignition switch of claim 1, wherein the slide member is rotatable within the collar.

8. The ignition switch of claim 1, wherein a lip is provided at a distal end of the collar.

9. The ignition switch of claim 1, wherein a lip extends inward from the collar.

10. The ignition switch of claim 1, wherein the slide member is part of a key buzzer switch configured to activate a key buzzer warning system when the key is in the ignition system and the switch mechanism is in the OFF position.

11. The ignition switch of claim 1, wherein the key positions include an OFF position, an ACC position, a RUN position and a START position.

12. The ignition switch of claim 1, further comprising a moveable wall located within the collar, the moveable wall being rotatably moveable and configured to obstruct the side opening when moved adjacent thereto.

13. An ignition switch for engagement with a lock housing driver of a motor vehicle having a key activated ignition system, the ignition switch comprising:
   a switch mechanism, the switch mechanism having portions moveable between multiple key positions;
   a casing, the switch mechanism being enclosed within the casing and the casing including a collar extending from a side wall of the casing and terminating at a distal end, the collar further defining a collar wall having a side opening extending from the distal end toward the side wall of the casing; and
   the switch mechanism further including a moveable wall positioned within the collar, the moveable wall being moveable from a first position adjacent to the collar wall whereby access through the side opening into the collar is permitted and a second position adjacent to the collar wall whereby the side opening is obstructed by the moveable wall such that access through the side opening into the collar is permitted.

14. The ignition switch of claim 13 wherein the moveable wall is rotatable.

15. The ignition switch of claim 13 wherein the moveable wall is positioned opposite of an opening defined between guide wall portions that are moveable with the wall.

16. The ignition switch of claim 13 wherein a flange is formed on a distal end of the collar.

17. The ignition switch of claim 16 wherein the flange radially inwardly directed.

18. The ignition switch of claim 17 wherein the moveable wall is located beneath the flange when the moveable wall is not obstructing the side opening.

19. An ignition switch for engagement with a lock housing river of a motor vehicle having a key activated ignition system, the ignition switch comprising:
- a switch mechanism, the switch mechanism having portions moveable between multiple key positions;
- a casing, the switch mechanism being enclosed within the casing and the casing including a collar extending from a side wall of the casing and terminating at a distal end, the collar further having a side opening extending from the distal end toward the side wall of the casing; and
- the switch mechanism further including a moveable wall member positioned within the collar, the moveable wall member being moveable from a first position whereby a central region within the collar is accessible through the side opening and a second position whereby the side opening is obstructed by the wall member such that the central region is not accessible through the side opening; and
- a slide member located within the collar and being moveable between a position engaging an interference formed in the collar and a position where the slide member is not engaged with the interference.

20. The ignition switch of claim 19 wherein the interference is a recess formed in a radially inwardly directed flange on a distal end of the collar.

* * * * *

UNITED STATES PATENT AND TRADEMARK OFFICE
CERTIFICATE OF CORRECTION

Page 1 of 1

PATENT NO. : 8,680,410 B2
APPLICATION NO. : 13/214551
DATED : March 25, 2014
INVENTOR(S) : Donald J. Siler et al.

It is certified that error appears in the above-identified patent and that said Letters Patent is hereby corrected as shown below:

In the Claims

Column 7, line 5, delete "river" and insert --driver--.

Signed and Sealed this
Second Day of September, 2014

Michelle K. Lee
*Deputy Director of the United States Patent and Trademark Office*